United States Patent
Kalibjian

[19]

[11] Patent Number: 6,141,136
[45] Date of Patent: Oct. 31, 2000

[54] ACTIVE PHASE-SHIFT CONTROL IN OPTICAL-HYBRID ETALONS

[76] Inventor: Ralph Kalibjian, 1051 Batavia Ave., Livermore, Calif. 94550-5516

[21] Appl. No.: 09/384,688

[22] Filed: Aug. 27, 1999

[51] Int. Cl.[7] ..................................................... G02F 1/03
[52] U.S. Cl. .......................... 359/260; 359/618; 359/122; 359/189
[58] Field of Search .................................... 359/618, 122, 359/189, 192, 629, 639, 640, 260

[56] References Cited

U.S. PATENT DOCUMENTS

| | | | |
|---|---|---|---|
| 4,823,357 | 4/1989 | Casey | 372/92 |
| 4,871,232 | 10/1989 | Grinberg et al. | 350/162.11 |
| 5,054,884 | 10/1991 | Kubota | 359/566 |
| 5,134,276 | 7/1992 | Hobbs | 250/208.2 |
| 5,864,836 | 3/2000 | Balsi et al. | 706/40 |
| 5,903,393 | 5/1999 | Kalibjian | 359/618 |
| 5,907,404 | 5/1999 | Marron et al. | 356/360 |
| 6,043,861 | 3/2000 | Davis | 349/193 |

OTHER PUBLICATIONS

L. G. Kazovsky, "Phase–and Polarization–Diversity Coherent Optical Techniques", J. of Lightwave Tech., vol. 7, No. 2, Feb. 1989, pp. 279–292.

G. L. Abbas, et al., "A Dual–Detector Optical Heterodyne Receiver for Local Oscillation Noise Suppression," J. of Lightwave Tech., vol. LT–3, No. 5, Oct. 1985, pp. 1110–1122.

R. Kalibjian, "Optical–Hybrid Etalons for Simultaneous Phase– and Polarization–Diversity Operations," Optics Communications, vol. 161; Mar. 1, 1999; pp. 95–105.

D.W. Stowe, et al., "Demodulation on Interferametric Sensors Using a Fiber–Optic Passive Quadrature Demodulator," J. of Lightwave Tech., vol. LT–1, No. 3, Sep. 1983, pp. 519–523.

D. Hoffmann, et al., "Integrated Optics Eight–Port 90° Hybrid on LiNbO$_3$", J. of Lightwave Tech., vol. 7, No. 5, May 1989, pp. 794–798.

*Primary Examiner*—Georgia Epps
*Assistant Examiner*—Timothy Thompson

[57] ABSTRACT

Active phase-shift control is achieved in a hybrid etalon by selecting appropriate elements in the photodiode array 22, 22' of FIG. 2 for a prescribed phase-shift. A negative lens 20, (20") is used to expand the beam spot of the output beams P$_2$ 16, (P$_1$ 18) to the line length of the photodiode array 22, (22'). The signal beam 14 and the LO (local oscillator) beam 12 are angularly misaligned by the incident beam angle δ 26 to the 2-face 8 and δ' 26' to the 1-face 10 (δ'≠δ), thus resulting in the misaligned signal and LO beamlets inside the etalon 6. The beamlets from the 2-face 8 comprise the P$_2$ beam 16 and the beamlets from the 1-face 10 comprise the P$_1$ beam 18. The photodiode array 22, 22' detects an interference fringe pattern in the output beams P$_1$ 18 and P$_2$ 16 due to the misaligned input beams. The beamlets from the 2-face 8 and the 1-face 10 have been expanded for illustrative purposes in FIG. 2 lie within the initial beam diameters of the signal 14 and LO 12 beams. Both input beams 12, 14 are linearly polarized, and the signal beam 14 has a variable polarization angle. For a conventional etalon 6 the polarization angle of the LO beam 12 bisects the crystal axes of the input quarter-waveplate 24. The input quarter-waveplate 24 in the signal channel allows the polarization angle of the signal beam to combine into the overall phase angle of the output beams of the hybrid and thereby makes possible to have simultaneous phase- and polarization-diversity properties in the hybrid.

6 Claims, 7 Drawing Sheets

ACTIVE PHASE-SHIFT CONTROL IN OPTICAL-HYBRID ETALONS

BACKGROUND

1. Field of Invention

The present invention is in the field of phase-shift control in optical-hybrid etalons having simultaneous phase- and polarization-diversity properties.

2. Discussion of Prior Art

An unbalanced hybrid produce output waveforms with prescribed phase-shifts from p-branches whereas in a balanced hybrid the outputs are from 2p-branches [1]. For example, p=2 corresponds to a 90°-hybrid having two outputs with quadraturely-phased signals, and p=3 corresponds to a 120°-hybrid having three output signals separated by 120° in phase between ports. Other p-branch versions can also be formed. Balanced hybrids generate both a plus and a minus phase signal such that when the two signals are detected by a balanced-pair photodiode the dc components of the signals can be subtracted thereby minimizing the LO (local oscillator) laser intensity-noise [2] in homodyne receivers. The LO intensity noise in unbalanced hybrids can also be minimized by the use of an auto-balanced photoreceiver [3] because the receiver subtracts a reference beam (as derived from the LO beam) from the signals. Single-channel hybrids could be made insensitive to either phase or polarization fluctuations but not simultaneously to both types of fluctuations. However, simultaneous diversity (or immunity) to both phase and polarization can now be obtained with the recently developed single-channel optical-hybrid etalons [4]. Performance of balanced 90°- and 180°-hybrid etalons have been reported in reference [5].

In some hybrids the phase relationship in the output beams of a hybrid cannot be changed once a hybrid configuration has been selected. For example, in a fiber-optic hybrid the phase-shift is monitored during the drawing/fusing process in order to fix a prescribed phase shift in the output fibers of the coupler. The phase relationship between the output fibers cannot be altered after the fibers have been fused [6]. In bulk-optic hybrids, generally, the optical components are bonded in a miniaturized encapsulated package and thus cannot be easily re-assembled to other phase configurations. Limited phase control is possible in an integrated-optic hybrid [7] by varying the refractive index of the electro-optic waveguide with an applied electric field. In this present invention active phase control in an optical-hybrid etalon will be described.

REFERENCES

[1] L. G. Kazovsky, "Phase- and polarization-diversity coherent optical techniques", Journal of Lightwave Technology, Vol. 7, No. 2, February 1989, pp. 279–292.

[2] G. L. Abbas, et al., "A dual-detector optical heterodyne receiver for local oscillation noise suppression", Journal of Lightwave Technology, Vol. LT-3, No. 5, October 1985, pp. 1110–1122.

[3] P. C. D. Hobbs, U.S. Pat. No. 5,134,276, Jul. 28, 1992.

[4] R. Kalibjian, U.S. Pat. No. 5,903,393, May 11, 1999.

[5] R. Kalibjian, "Optical-hybrid etalons for simultaneous phase- and polarization-diversity operations", Optics Communications, Vol. 161, Mar. 1, 1999, pp. 95–105.

[6] D. W. Stowe, et al., "Demodulation of interferometric sensors using a fiber-optic passive quadrature demodulator", Journal of Lightwave Technology, Vol. LT-1, No. 3, September 1983, pp. 519–523.

[7] D. Hoffmann, et al., "Integrated optics eight-port 90° hybrid on $LiNbO_3$", Journal of Lightwave Technology, Vol. 7, No. 5, May 1989, pp. 794–798.

[8] W. L. Casey, U.S. Pat. No. 4,823,357, Apr. 18, 1989.

[9] J. Grinberg, et al., U.S. Pat. No. 4,871,232, Oct. 3, 1989.

[10] T. Kubota, U.S. Pat. No. 5,054,884, Oct. 8, 1991.

SUMMARY

In the present invention a method has been devised for actively controlling the phase-shift in an optical-hybrid etalon by introducing a slight angular misalignment in the signal and the LO beams in the etalon. The resulting in inter reference fringe pattern in the output beam as detected by a linear array photodiode gives rise to a spatially-related phase-shift signal as mapped out onto the array elements of the photodiode. Thus, appropriate array elements can then be selected to give any desired phase relationship between the output beams.

Accordingly, it is an object of my invention to create the fringe pattern with angularly misaligned beams in a conventional etalon. The fringe pattern is the spatial overlap region between the two beams which can be optically expanded to the size of the linear array photodiode. The output processor from the photodiode could furnish either balanced or unbalanced outputs having simultaneous phase- and polarization-diversity properties It is yet another object of my invention to vary the phase shift in a QWP (quarter-waveplate)/etalon by varying the etalon reflectivity R. This requires only a single element photodiode detecting of the output beam for co-linearly aligned signal and LO beams inside the etalon.

It is still another object of my invention to transform the phase shift in a 90°-hybrid into a 120°-hybrid by re-configuring only the output ports from 4 to 3-ports for a fixed etalon reflectivity of R=0.268 in a hybrid having a QWP/etalon.

A further objective is to create a unique light-beam modulator using the 120°-hybrid.

Further objects and advantages of my invention will become apparent from a consideration of the drawings and the ensuing description.

DESCRIPTION OF THE PREFERRED EMBODIMENTS

Figure 1:
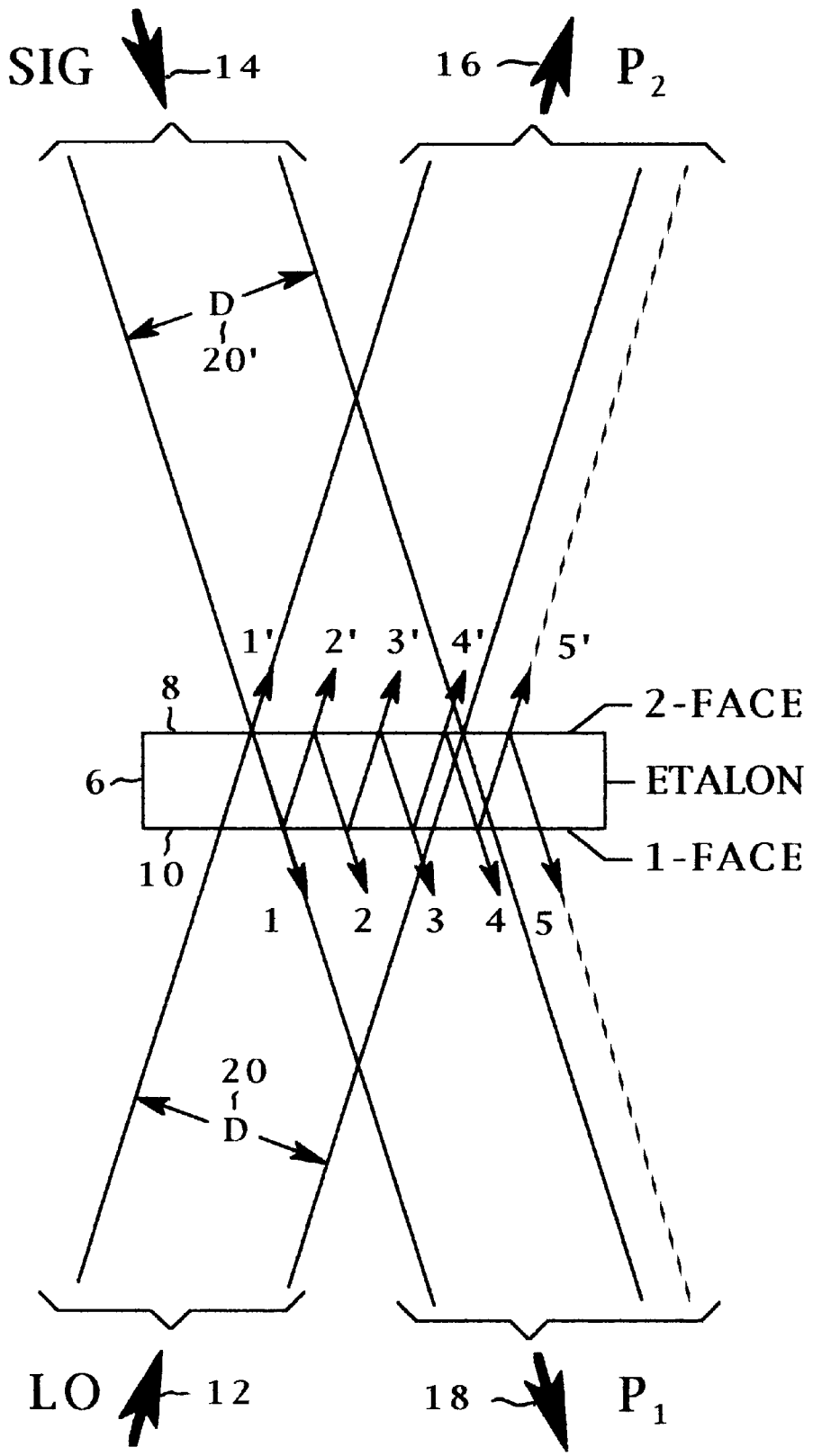
FIG. 1 shows the multiple beamlet paths inside the etalon when irradiated contra-directionally by the signal and the LO beams having the same incident beam angle on opposite faces of the etalon.

The underlying principle for the optical-hybrid is the mixing of linearly polarized, co-linearly aligned signal and LO beams in an etalon as shown in FIG. 1. The inventor has already shown experimentally in reference [5] the performance of a 90°-hybrid having a QWP/etalon and a 180°-hybrid having a conventional etalon. The key component of the hybrid is an etalon wherein the signal beam 14 and the LO beam 12 of diameter D 20', 20 are contra-directionally incident onto the 2-face 8 and the 1-face 10 of etalon 6, respectively. For this illustrative example of the etalon 6, both beams 14, 12 are linearly polarized with the same state of polarization. By maintaining equal incident-beam angles to the etalon 6, the reflected signal beam is made co-linear to the transmitted LO beam inside the etalon thereby resulting in the mixed output beam $P_2$ 16; likewise, the reflected LO beam is also made co-linear to the transmitted signal beam resulting in the mixed output beam $P_1$ 18. For coherent light sources the mixed internally-reflected beamlets 1', 2', 3', 4', 5' comprise the output interference beam $P_2$ 16 and the mixed reflected beamlets 1, 2, 3, 4, 5 comprise the output interference beam $P_1$ 18. Nor small beam angles, the reflected beamlets in a Fabry-Perot etalon occur within the beam diameter D 20, 20'. For large beam angles and low reflectivity etalons some beamlets such as 5, 5' could occur external to the main beam diameter D 20, 20'. Etalons are frequently confused with slab waveguides because of the similarity in the zig-zag light beam path in the substrate. The etalon is inherently different from a slab waveguide. Operationally, etalons rely on interference phenomena, whereas, slab waveguides do not and are used typically for multi-beam combiners and splitters with relatively large internodal spacing between beamlets (for examples, see references [8], [9], and [10]).

Figure 2:
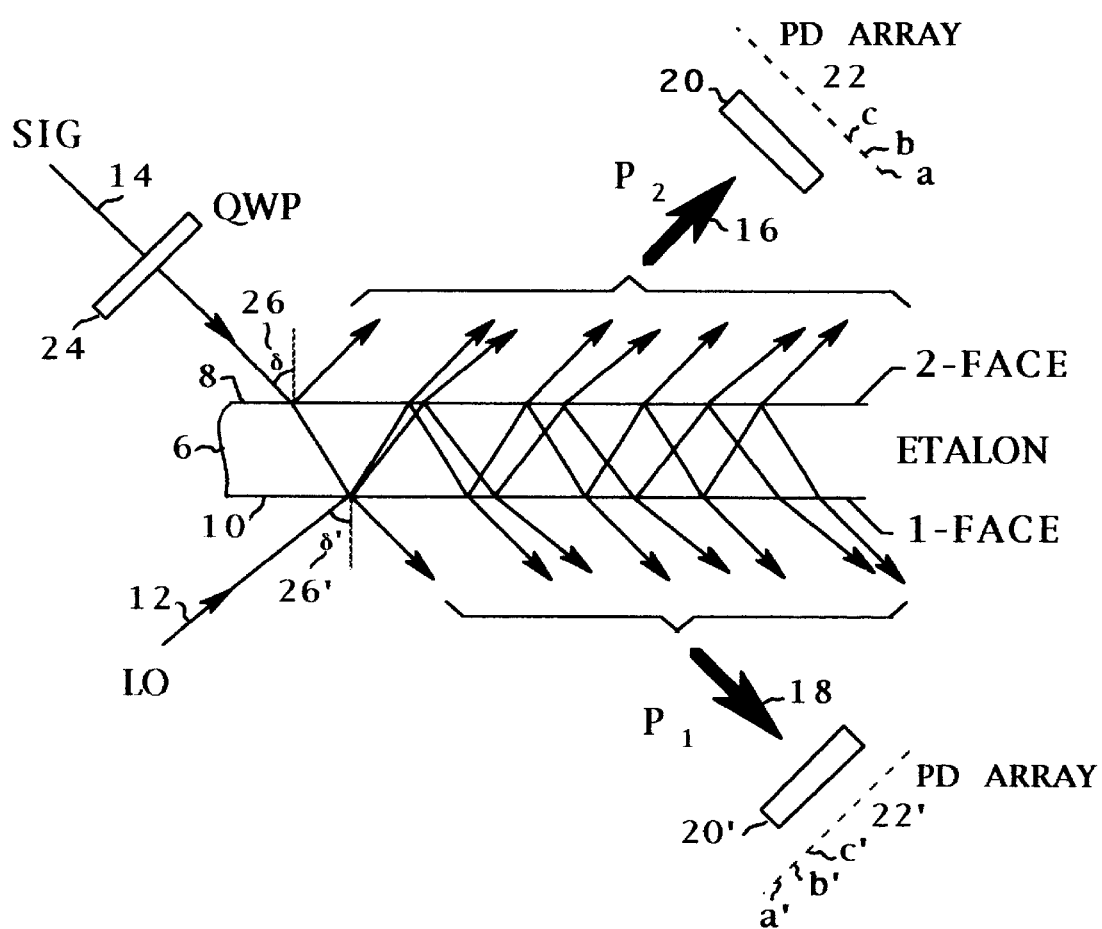
FIG. 2 shows the angularly misaligned beam paths inside the etalon.

Active phase control is achieved in an etalon with misaligned signal 14 and LO 12 beams having slightly different incident beam angles δ 26 and δ' 26' (δ'≠δ) to the etalon 6 faces 8, 10 as shown in FIG. 2. The LO beam 12 is incident to the 1-face 10 of the etalon 6 and the signal beam 14 is incident to the 2-face 8. The beam angle δ is adjusted to satisfy the etalon phase angle $\Psi=(4\pi nd/\lambda)\cos(\delta)=(2m-1)\pi$ requirement for a conventional etalon as prescribed in references [4] and [5] where λ is the free-space wavelength, n is the refractive index of the etalon, d is the etalon thickness, and m=1,2,3, . . . Both input beams 12, 14 are linearly polarized, however the signal beam 14 has a variable polarization angle $\theta_S$. A QWP 24 interposed between the input port of the signal 14 and the 2-face 8 of the etalon 6 allows $\theta_S$ to be combined into the overall phase angle of the output beam $P_1$, ($P_2$) 18, (16). The polarization plane of the LO beam 12 bisects the QWP 24 crystal axes for a conventional etalon 6; whereas, for a waveplate etalon the crystal axes of the etalon bisect the axes of the input QWP 24 and the polarization plane of the LO beam 12 is oriented parallel to either axis of the input QWP 24. The misaligned beamlets from the 2-face 8 comprise the output beam $P_2$ 16, and the misaligned beamlets from the 1-face comprise the output beam $P_1$ 18. The interference between the misaligned signal and LO beamlets in the etalon 6 creators a fringe pattern in the beam spot of the output beams $P_1$ 18 and $P_2$ 16. A negative cylindrical lens 20, (20') expands the beam spot of $P_2$ 16, ($P_1$ 18) to the line length of the photodiode array 22, (22') having elements abc . . . , (a'b'c' . . . ). A single element of the linear-array photodiode corresponds to the phase of a discrete spatial point in the fringe pattern. For a prescribed phase-shift in a p- or 2p-branch configuration in the hybrid output, appropriate elements of the array can be actively selected electronically by a photodiode processor unit. By electronically squaring and summing the photodiode currents of the output beams from the selected elements of the photodiode array 22, 22' the resulting electrical output signal from the photodiode processor has simultaneous diversity to the polarization angle of the input signal and to the phase of both input beams.

Interference of misaligned bear is can be readily understood from the concept of two planar-wavefronts that are tilted to each other thus resulting in a fringe pattern for a tilted-plate interferometer. When observed on the photodiode array 22, 22' on a plane normal to the propagation direction of the wavefronts, the fringe pattern has a spatial period $x_o$ along the array length $$x_o = \frac{\lambda}{n(\Delta\delta_o)} \quad (1)$$

where $\Delta\delta_o$ is a very small misaligned beam angle such that the phase shift across the beam diameter corresponds to a full $2\pi$ period. Thus, the phase shift φ as mapped out spatially on the array elements 22abc . . . , 22'a'b'c' . . . by the tilted wavefronts is $$\phi = \frac{\pi n x (\Delta\delta)}{\lambda} \quad (2)$$

where the unscripted x and $\Delta\delta$ are not limited in magnitude. The phase φ is combined into the overall phase angle of the output beams $P_1$, ($P_2$) 18, (16) from the etalon facet 10, (8) in FIG. 2. For example for p=2, the outputs at the 2-face 8 and the 1-face 10 of the etalon have interference components $$P_2 \sim \cos(\Phi-\theta_S+\phi_2), P_1 \sim \cos(\Phi-\theta_S+\phi_1) \quad (3)$$

where Φ is the phase angle difference between the signal and the LO lightwave beams, $\theta_S$ is the polarization angle of the signal wave, and $\phi_2$ and $\phi_1$ are the phase angles selected from the array elements 22abc . . . , 22'a'b'c' of the detector. For example, by selecting those array elements for $\phi_1=0°$ and $\phi_2=90°$, the output becomes $P_1 \sim \cos(\Phi-\theta_S)$ and $P_2 \sim \sin(\Phi-\theta_S)$ which are quadrature components for a 90°-hybrid. Alternatively, two different elements in the same photodiode for a given face of the etalon 6 can be selected instead to give the same phase shifts of 0° and 90°. Other combinations in phase shifts from the plurality of array elements 22abc . . . , 22'a'b'c' . . . could be actively selected electronically by means of a processor interfaced to the photodiode.

Figure 3:
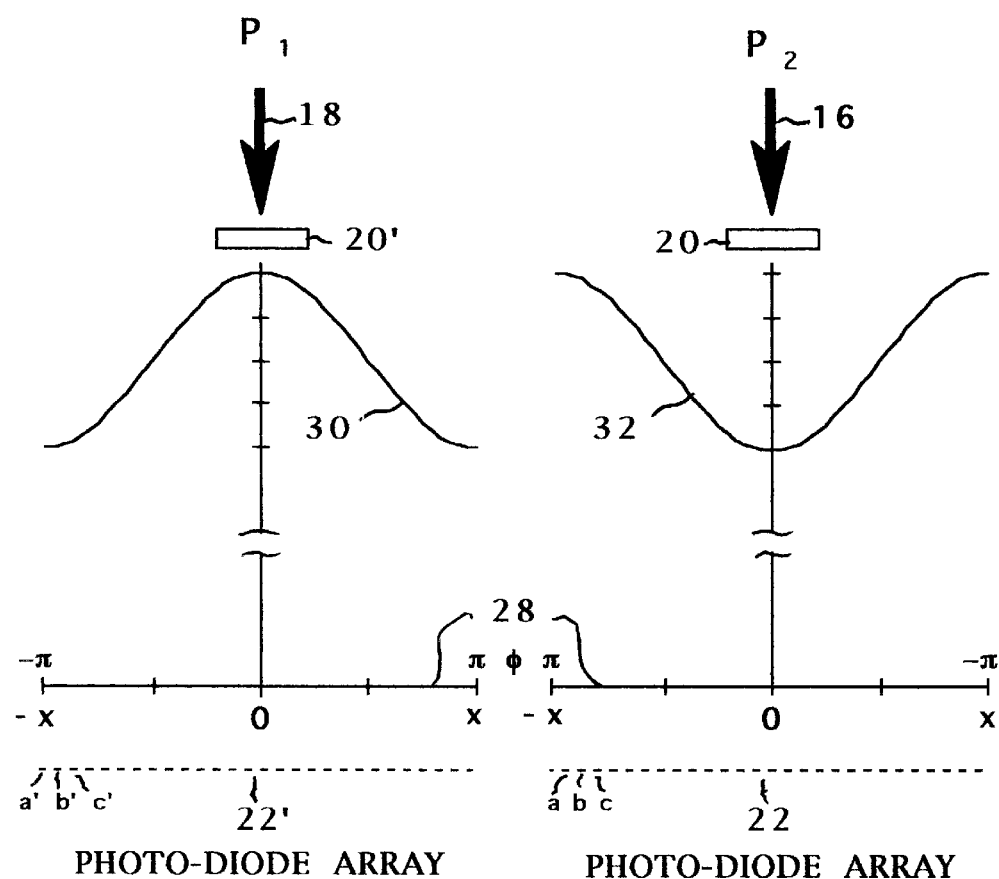
FIG. 3 shows the fringe pattern due to the interference of the misaligned beams in the etalon.
Figure 3:
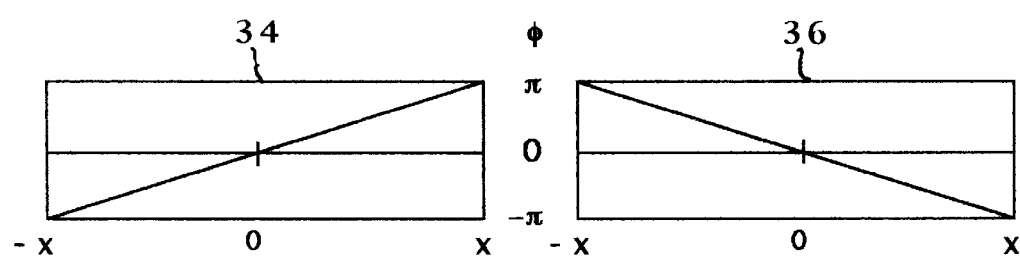

FIG. 3 shows the intensity and phase relationships of the output beams $P_1$ 18 and $P_2$ 16 for the angularly misaligned input beams. The fringe pattern as expanded by the negative cylindrical lens 20', (20) gives the intensity distribution 30, (32) for the output beam 18, (16). The spatial scale factor x and the corresponding phase scale φ of the photodiode array 22', (22) are given in the abscissa 28. The linear relationship between the phase φ and the spatial factor x is indicated in 34, 36. The photodiode array 22', (22) is in the same direction as x; thus, the array elements a'b'c' . . . , (abc . . . ) dissect the fringe pattern into discrete "phase-packets" which are then electronically processed for use in a prescribed format.

Figure 4:
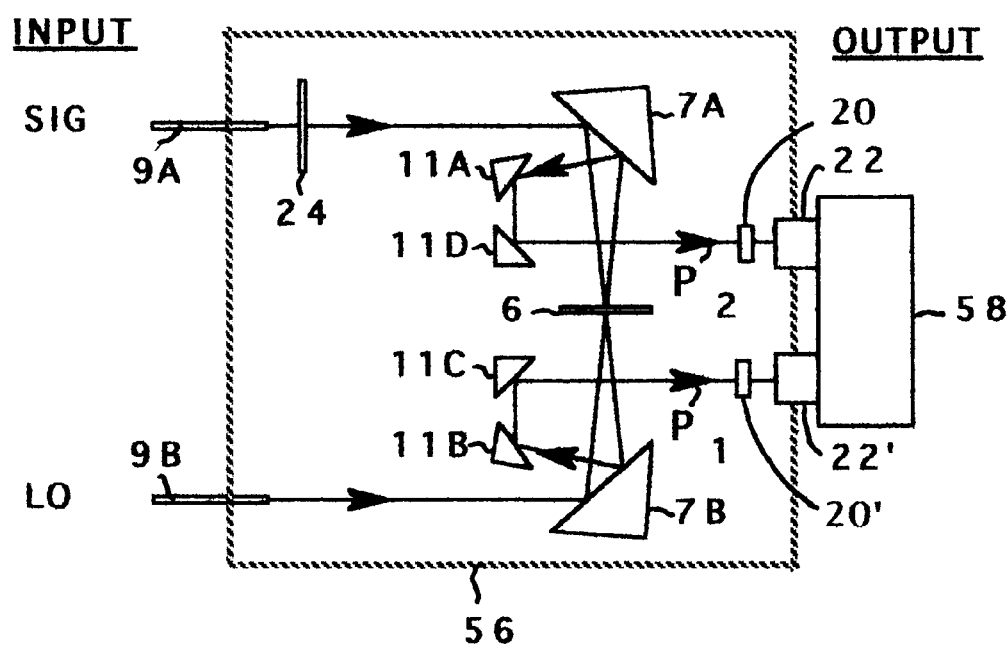
FIG. 4 shows the module for the hybrid etalon with the misaligned incident beams.
Figure 4:
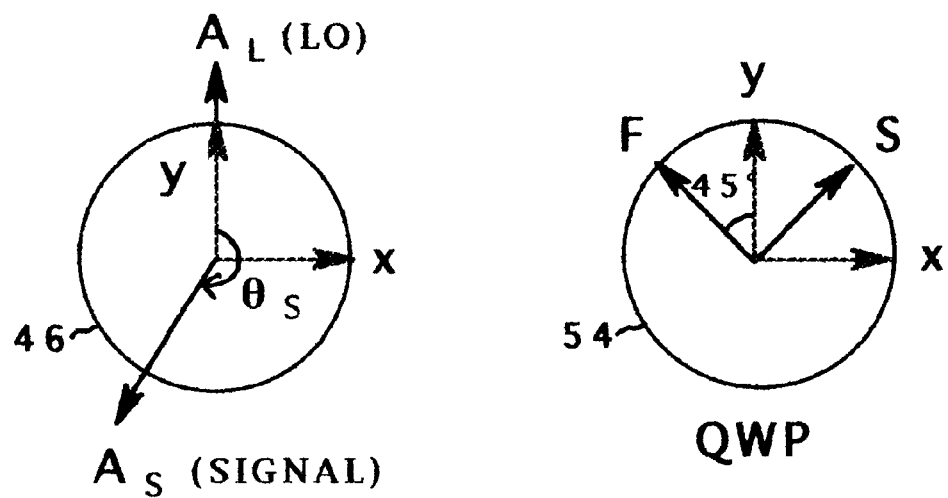

An implementation of the phase shift controlled hybrid etalon is shown in the module 56 of FIG. 4 with a conventional etalon 6 (alternatively, a waveplate etalon could be used as well). GRIN (gradient index) lenses 9A, (9B) are used for coupling the signal and the LO light beams into the beam-steering prism mirrors 7A, (7B). An input QWP 24 interposed in the signal channel allows the signal polarization angle $\theta_S$ to combine into the overall phase angle of the output beam. The output beams from the etalon 6 faces are compactly folded by the right-angle prism mirrors 11A, 11B, 11C, 11D. The output beam spots are expanded to the size of the linear array photodiode 22, (22') by the negative cylindrical lenses 20, (20'). An electronic processor 58 is interfaced to the photodiodes 22, 22' for the purpose of selecting prescribed phase-shift configurations from the hybrid output. As shown in the polar diagrams 46 and 54 the polarization plane of the linearly polarized LO beam is fixed and bisects the F (fast) and S (slow) crystal axes of the input QWP 24 for a hybrid having a conventional etalon 6; whereas, the linearly polarized signal beam has a variable polarization angle $\theta_S$ as indicated in the diagram 46. The etalon 6 could also be a waveplate instead, in which case the F and S axes of the etalon 6 and the QWP 24 bisect each other and the polarization plane of the LO beam is then oriented parallel to either axis of the QWP 24.

Figure 5:
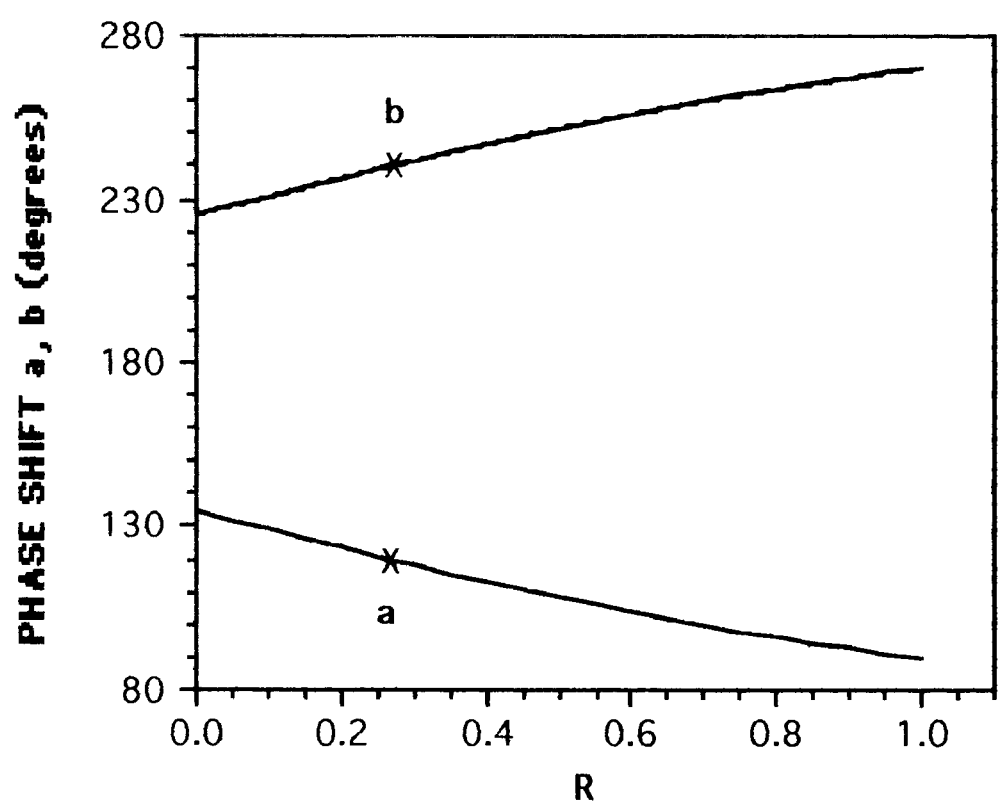
FIG. 5 shows the phase shift in the output beams vs reflectivity for a QWP/etalon.

The etalon reflectivity R can also control the phase-shift in the hybrid output. It can be shown from the 90°-hybrid equations derived in reference [5] that the modification of the hybrid configuration from 4-ports to 3-port results in a 120°-hybrid having simultaneous phase- and polarization-diversity properties similar to the 90°-hybrid for the same R value. The output beam power from the modified 90°-hybrid are $$P_1 = \frac{2P_L R + P_S(1+R^2) - 2\sqrt{P_L P_S R}\,(1-R)\cos\Phi'}{(1+R)^2} \quad (4)$$

$$P_{2y} = \frac{P_L(1+R^2) + 2P_S R - 2\sqrt{2P_L P_S R(1+R^2)}\,\cos(\Phi'+a)}{2(1+R)^2} \quad (5)$$

$$P_{2x} = \frac{P_L(1+R^2) + 2P_S R - 2\sqrt{2P_L P_S R(1+R^2)}\,\cos(\Phi'+b)}{2(1+R)^2} \quad (6)$$

$$a = 45° + \arctan\left(\frac{1}{R}\right), \quad b = 225° + \arctan(R) \quad (7)$$

$$-\sqrt{1+R^2}\,\cos(\Phi'+a) = \sin(\Phi'+45°) - R\cos(\Phi'+45°) \quad (8)$$

$$-\sqrt{1+R^2}\,\cos(\Phi'+b) = -R\sin(\Phi'+45°) + \cos(\Phi'+45°) \quad (9)$$

where $\Phi'=(\Phi-\theta_S)$, and $P_L$ and $P_S$ are the LO and the signal beam power, respectively. The trigonometric identities of equations (8) and (9) are used for transforming the equations for the output beams from the 2-face in reference [5] to the expressions in equations (5) and (6) which show explicitly the dependence on the phase shifts a and b in the hybrid output as controlled by the reflectivity R in equation (7). A plot of equation (7) in FIG. 5 shows the angular separation between a and b diverging from a minimum of 90° to a maximum of 180°. Thus, R=tan 15°=(2−√3)=0.268 provides uniquely the required phase shifts of a=120° and b=240° for the 120°-hybrid as shown by x's in FIG. 5. R=0.268 is also equal identically to the value required for producing balanced outputs from the 90°-hybrid etalon. From equations (4), (5), and (6) the output beams from the 120°-hybrid for R=0.268 can then be re-written as $$P_1 = \frac{1}{3}P_L + \frac{2}{3}P_S - \frac{1}{3}\sqrt{2P_L P_S}\,\cos\Phi' \quad (10)$$

$$P_{2y} = \frac{1}{3}P_L + \frac{1}{6}P_S - \frac{1}{3}\sqrt{2P_L P_S}\,\cos(\Phi'+120°) \quad (11)$$

$$P_{2x} = \frac{1}{3}P_L + \frac{1}{6}P_S - \frac{1}{3}\sqrt{2P_L P_S}\,\cos(\Phi'+240°). \quad (12)$$

Figure 6:
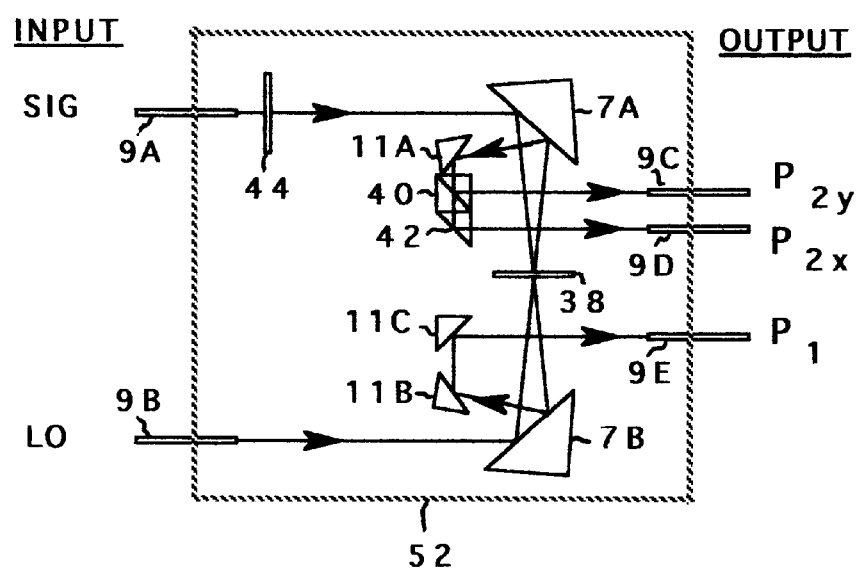
FIG. 6 shows the module for a 120°-hybrid with a QWP etalon having a reflectivity R=0.268 and an etalon phase angle $\Psi=(m-1)\pi$.
Figure 6:
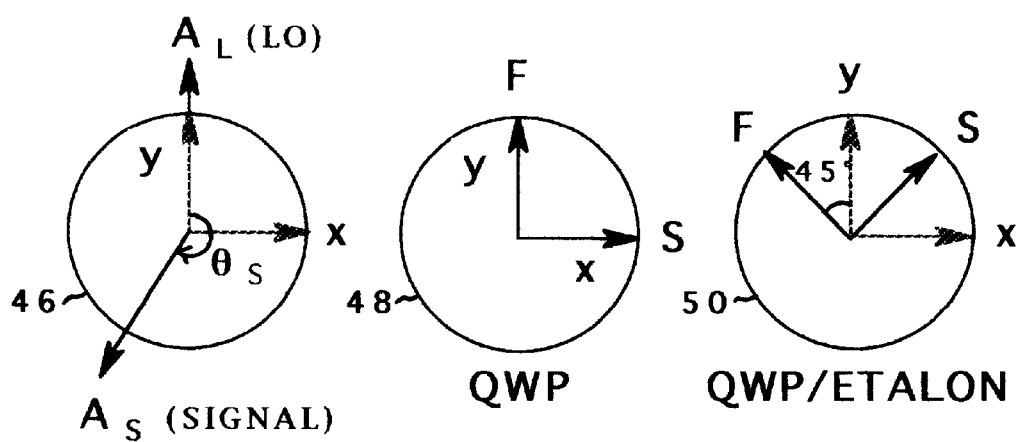

The implementation for the 120°-hybrid is shown in the module 52 in FIG. 6. Inside the QWP/etalon 38 the signal and LO beams are co-linearly aligned (similar to the co-linear beam path geometry in FIG. 1) by steering the beams to equal incident beam angles at the etalon faces with the beam-steering prism mirrors 7A, 7B. The incident beam angle is selected to make the etalon phase angle $\Psi=(m-1)\pi$ which is the same as for the 90°-hybrid QWP/etalon in references [4] and [5]. The mixing of the co-linearly aligned signal and LO beams inside the QWP/etalon generates the output interference beams $P_1$ and $P_2$. The layout for the module is similar to that of FIG. 4 except for the the re-direction of the $P_2$ beam (by prism mirror 11A) into the polarizing beam splitter 40 which splits out orthogonally polarized components $P_{2y}$ and $P_{2x}$. The beam splitter 40 re-directs the y-polarized output $P_{2y}$ into the GRIN lens 9C, and prism mirror 42 re-directs the x-polarized output $P_{2x}$ into the GRIN lens 9D. The $P_1$ output is re-directed by prism mirrors 11B and 11C into GRIN lens 9E. The polarization states of the signal and the LO beams are indicated in the diagram of 46 (the LO beam could be aligned just as well along the x-axis). The orientation of the F and S axes of the input QWP 44 (shown in diagram 48) bisect the F and S axes of the QWP/etalon 38 (shown in diagram 50). The linearly polarized signal beam initially transmits through an input QWP 44 which allows the polarization angle $\theta_S$ of the beam to combine into the overall phase angle of the output lightwave. Balanced outputs from a 120°-hybrid require 6-ports; however, the QWP/etalon 38 has only 3-ports 9C, 9D, 9E which means the in-phase LO laser intensity-noise current [associated with the $P_L$ term in equations (10), (11), and (12)] will degrade detector performance as described in reference [2]. However, an auto-balanced 3-channel photo-receiver optically coupled to the output ports 9C, 9D, 9E can be used to minimize the noise of the LO beam because the receiver subtracts the reference LO from the signal photocurrents, thereby canceling noise signals common to both channels as described in reference [3]. This places an additional power demand on the LO laser source because the reference beam to the photoreceiver is derived from the same LO source. If the three capacitively coupled output currents A, B, C from the photoreceiver are electronically squared and summed for a coherent receiver application, the resulting signal is (⅓)r²$P_L P_S$ (where r is the responsivity of the photodiode) which is independent of both phase and linear polarization fluctuations. For a fiber sensor application where the measurand is phase $\phi$, the signal can be recovered electronically in real time by using a signal-processing algorithm as given by the integral $$\frac{2}{\sqrt{3}}\int [B(dA/dt) - A(dB/dt)]dt$$

where t is time, and A, B are for a given pair of output signals from the 120°-hybrid. The signal can be enhanced by summing additional processors for pairs A, C and B, C.

Figure 7:
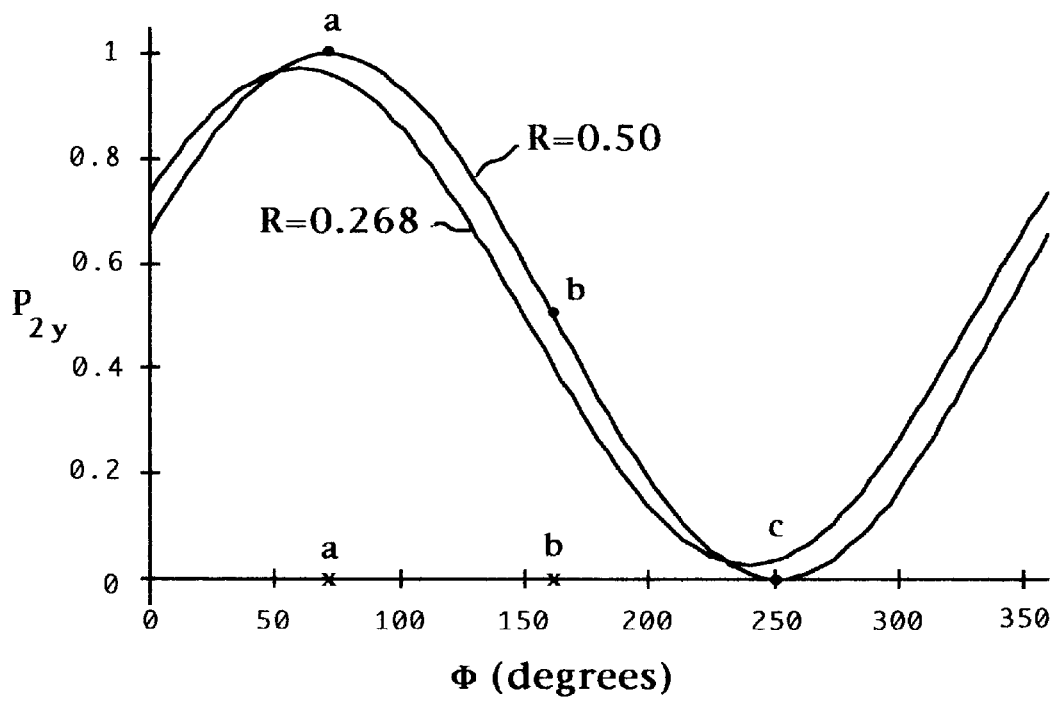
FIG. 7 shows the 120°-hybrid light-beam modulator and the phase response of the output beam.
Figure 7:
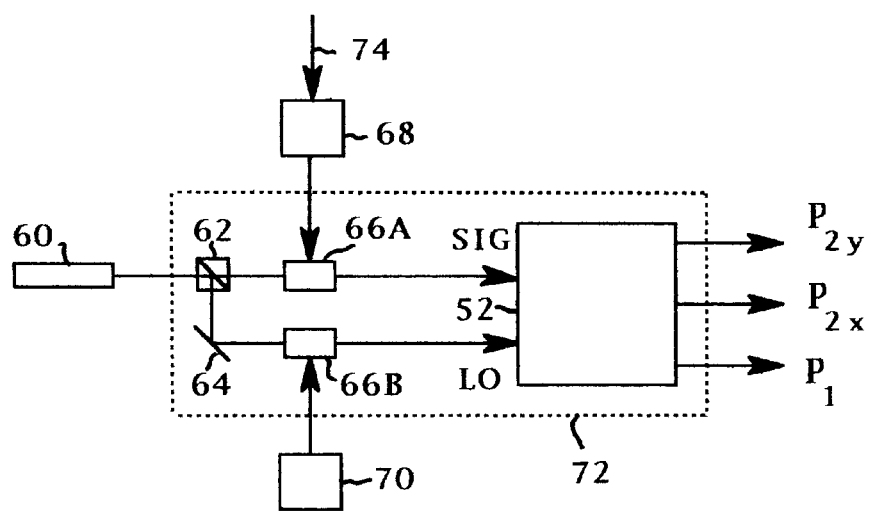

The 120°-hybrid etalon can be used in a light beam modulator because the output waveforms $P_{2y}$ an $P_{2x}$ have a very high modulation index [defined as $(I_{max}-I_{min})/(I_{max}+I_{min})$ where $I_{max}$ and $I_{min}$ are the maximum and minimum levels of the output response, respectively]. The phase response for $P_{2y}$ from equation (5) is plotted in the graph of FIG. 7 for R=0.268 and R=0.5. $P_{2x}$ (not plotted) has a similar response but plase shifted by 120° from $P_{2y}$ for R=0.268 and shifted by 143° for R=0.5. Increasing the etalon reflectivity R increases the modulation index to 99.4% for R=0.50 as compared to 94.2% for the R=0.268 reflectivity. For the modulator in the module unit 72 of FIG. 7 the collimated light beam from the laser 60 is split and re-directed by the beamsplitter 62 and the mirror 64 into two beams for the signal and LO input ports of the 120°-hybrid 52. A phase shifter 66A, 66B is placed in each input port of the hybrid 52. In this example, the phase shifter 66B in the LO port is used for phase biasing as controlled electronically by the bias controller 70; whereas, the phase shifter 66A in the signal port is used for digital modulation of 1's and 0's as controlled electronically by the phase-encoder 68 driven by the input data line 74. The importance of phase biasing is shown in the graph of FIG. 7. For digital modulation the phase bias should be either at point a (70°) corresponding to a digital 1 or at point c corresponding to a 0 (250°) for the R=0.5 curve. Digital modulation requires 180° phase-angle switching in the phase shifter 66A; for example, by phase switching periodically from bias point to bias point (a to c, c to a, etc.) a string of 1's and 0's are generated as light pulses in the $P_{2y}$ waveform having nearly a 100% modulation index. A similarly modulated output also occurs for the $P_{2x}$ output; however, the waveform is phase-shifted by 143° for an etalon reflectivity R=0.5. The output beam $P_1$ is also digitally modulated with the same differential signal intensity as in the $P_2$ beams; however, the waveform has a high dc intensity level which limits the modulation index of the waveform to less than 50%. For a phase detector application the phase bias is located at the inflection point of the linear portion of the transfer curve at point b (160°) and the encoder 68 is now used as a signal conditioner.

In summary, active phase-shift control in hybrids can be achieved by introducing a very small angular misalignment in the signal and LO beams in the etalon. The elements of a linear-array photodiode detect and map-out spatially the intensity and phase of the interference fringe pattern of the output beams. Appropriate elements from the array can then be selected for the prescribed phase shifts in a p-branch hybrid. Phase-shift control can also be achieved in a QWP/ etalon by varying the etalon reflectivity. In particular for a reflectivity of R=0.268 the hybrid can be used either as a 90°- or a 120°-hybrid depending upon the geometrical configuration of the output ports. The 120°-hybrid can also be used in a light beam modulator or as a phase detector. As far a I have been able to determine from my literature search in technical journals and patents, active phase-shift control in optical hybrid etalons has not been reported in the unclassified literature. While my above description contains many specifications, these should not be construed as limitations on the scope of the invention, but rather as an exemplification of several preferred embodiments thereof.

I claim:

1. A method for active phase-shift control in an optical-hybrid etalon, comprising the steps of:
   (a) irradiating an etalon with misaligned input beams having slightly different incident bean angles on opposites faces of said etalon wherein said input reams are linearly polarized;
   (b) generating an interference fringe pattern from output beams on said faces by beam mixing means of said misaligned input beams in said etalon;
   (c) expanding said fringe pattern by optical means to the size of a linear array photodiode;
   (d) detecting intensity of said fringe pattern in said array photodiode thereby mapping out spatially the phase of said fringe pattern onto elements of said array photodiode; and
   (e) converting said output bean is of said etalon into electrical signals in said photodiode and selecting by photodiode processor means appropriate elements from said array photodiode for a prescribed phase-shift configuration of said hybrid etalon wherein a single element from said array photodiode corresponds to the phase of a discrete spatial point on said fringe pattern.

2. The method of claim 1 wherein internally-reflected beamlets of said etalon are generated by mixing means of a first input lightwave beam made incident to first face of said etalon and a second input lightwave beam transmit ted through an input quarter-waveplate made incident to second face of said etalon whereby said beamlets transmitted through partially reflecting faces of said etalon comprise said output beams of said hybrid.

3. The method of claim 2 wherein:
   (a) plane of polarization of said first input beam bisects crystal axes of said input quarter-waveplate in said hybrid having a conventional etalon thereby allowing polarization angle of said second input beam to combine into the overall phase angle of said output beams by beam mixing means; and
   (b) said electrical signals selected from said elements of said array photodiode are electronically squared and summed by said photodiode processor means whereby said output of said hybrid has simultaneous phase- and polarization-diversity properties.

4. An optical hybrid having phase-shift control, comprising of:
   (a) an etalon irradiated by an input local oscillator beam is made incident onto first face of said etalon and an input signal beam transmitted through an input quarter-waveplate is made incident onto second face of said etalon wherein said input beams are linearly polarized;
   (b) said input beams are angularly misaligned by beam steering means thereby presenting slightly different incident beam angles on said faces of said etalon;
   (c) an interference fringe pattern generated from output beams of said faces by beam mixing means of said misaligned input beams;
   (d) polarization plane of said local oscillator beam bisecting crystal axes of said input quarter-waveplate in said hybrid having a conventional etalon thereby allowing polarization angle of said input signal beam to combine into the overall phase angle of said output bean is by mixing means;
   (e) detection of said fringe pattern by a linear array photodiode thereby mapping out spatially the phase and intensity of said fringe pattern onto elements of said photodiode wherein a single element from said array photodiode corresponds to the phase of a discrete spatial point on said fringe pattern;
   (f) conversion of said output beams of said etalon into electrical signals in said array photodiode and electronic selection of appropriate elements of said array photodiode by photodiode processor means whereby a prescribed phase-shift configuration is obtained in said hybrid etalon; and
   (g) the electrical signals from said selected elements of said array photodiode are electronically squared and summed by said photodiode processor means thereby providing simultaneous phase and polarization diversity properties to said hybrid.

5. A 120°-hybrid etalon, comprising the steps of:
   (a) an input local oscillator beam a is made incident onto first face of a quarter-waveplate etalon and an input signal beam transmitted through an input quarter-waveplate is made incident onto second face of said etalon wherein said input beams are linearly polarized;

(b) polarization plane of said local oscillator beam bisects crystal axes of said quarter-waveplate etalon and crystal axis of said input quarter-waveplate is oriented parallel to said polarization plane of said local oscillator beam;

(c) providing substantially an etalon phase angle $\Psi=(m-1)\pi$ by beam steering means;

(d) mixing co-linearly said input beams inside said etalon with said input beams having equal incident beam angles to said faces of said etalon thereby generating output interference beams from said faces of said quarter-waveplate etalon;

(e) said output beam from said second face of said quarter-waveplate/etalon is split into two orthogonally polarized output beams by a polarizing beam-splitter whose axis is oriented parallel to said crystal axis of said input quarter-waveplate;

(f) varying phase-shift between said two orthogonally polarized output beams by means of varying reflectivity R of said faces of said quarter-waveplate etalon;

(g) phase shifting said two orthogonally polarized output beams by 120° from one another by beam mixing and beam splitting means and by providing substantially said reflectivity R=0.268 to said faces of said etalon wherein said output beam from said first face has a relative 0° phase angle and said two orthogonally polarized output beams from said second face have 120° and 240° phase angles with respect to said relative 0° phase angle of said output beam from said first face; and (h) providing photodiode detection and conversion of said output beams from said first and second faces of said etalon into electrical signals and electronically squaring and summing said electrical signals by photodiode processor means thereby providing simultaneous phase and polarization diversity properties in said hybrid.

6. The 120°-hybrid of claim 5, further including in a module unit:

(a) a light beam from a laser source re-directed into signal beam and local oscillator beam ports of said hybrid by beamsplitting means;

(b) said reflectivity R made greater than 0.268 on faces of said etalon thereby achieving nearly 100% modulation index in output waveforms from said second face of said hybrid; and (c) phase shifters interposed in said input ports of said hybrid wherein one phase shifter biases for optimum phase angle for said hybrid by bias control means and second phase shifter modulates said signal beam of said hybrid by phase encoder means whereby said module unit performs as a light beam modulator or as a phase detector.

* * * * *

UNITED STATES PATENT AND TRADEMARK OFFICE
CERTIFICATE OF CORRECTION

PATENT NO. : 6,141,136
DATED : October 31, 2000
INVENTOR(S) : Ralph Kalibjian

It is certified that error appears in the above-identified patent and that said Letters Patent is hereby corrected as shown below:

Title page, 4th line from the bottom of the page, change "Interferametric" to "--Interferometric--";

Column 2:
Line 9, change "resulting in inter ference" to "--resulting interference--";

Column 3:
Line 17, change "Nor." to "--For--";

Column 4:
Line, change "bear is" to "--beams--";

Column 7:
Line 54, change "reams" to "--beams--";
Line 65, change "bean is" to "--beams--";

Column 8:
Line 8, change "transmit ted" to "--transmitted--;
line 43, change "bean is" to "--beams--";

Signed and Sealed this

Twelfth Day of June, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,141,136
DATED : October 31, 2000
INVENTOR(S) : Ralph Kalibjian

It is certified that error appears in the above-identified patent and that said Letters Patent is hereby corrected as shown below:

Title page, 4th line from the bottom of the page, change "Interferametric" to "--Interferometric--";

Column 2:
Line 9, change "resulting in inter ference" to "--resulting interference--";

Column 3:
Line 17, change "Nor." to "--For--";

Column 4:
Line, change "bear is" to "--beams--";

Column 7:
Line 54, change "reams" to "--beams--";
Line 65, change "bean is" to "--beams--";

Column 8:
Line 8, change "transmit ted" to "--transmitted--;
Line 43, change "bean is" to "--beams--";

Signed and Sealed this

Seventh Day of August, 2001

*Attest:*

NICHOLAS P. GODICI
*Attesting Officer*     Acting Director of the United States Patent and Trademark Office